(12) United States Patent
Huang et al.

(10) Patent No.: US 9,665,142 B2
(45) Date of Patent: May 30, 2017

(54) MODEM AND METHOD OF ADJUSTING POWER

(71) Applicants: AMBIT MICROSYSTEMS (SHANGHAI) LTD., Shanghai (CN); HON HAI PRECISION INDUSTRY CO., LTD., New Taipei (TW)

(72) Inventors: Hau-Lung Huang, New Taipei (TW); Yue-De Tang, Shanghai (CN)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 137 days.

(21) Appl. No.: 14/483,170

(22) Filed: Sep. 11, 2014

(65) Prior Publication Data

US 2015/0277523 A1    Oct. 1, 2015

(30) Foreign Application Priority Data

Apr. 1, 2014    (CN) .......................... 2014 1 01289269

(51) Int. Cl.
*G06F 1/32* (2006.01)
*G06F 1/20* (2006.01)

(52) U.S. Cl.
CPC .............. *G06F 1/206* (2013.01); *G06F 1/324* (2013.01); *G06F 1/3206* (2013.01); *Y02B 60/1217* (2013.01)

(58) Field of Classification Search
CPC ................................... G06F 1/206; G06F 1/26
See application file for complete search history.

(56) References Cited

U.S. PATENT DOCUMENTS

| 6,078,795 | A  | * | 6/2000 | Miyazaki | ............. | H04B 17/318 |
| | | | | | | 455/226.2 |
| 7,292,625 | B2 | * | 11/2007 | Hsu | ........................ | H03J 1/0075 |
| | | | | | | 375/222 |
| 7,378,944 | B2 | * | 5/2008 | Cern | ........................ | H04B 3/54 |
| | | | | | | 340/12.32 |
| 2006/0084391 | A1 | * | 4/2006 | Chmiel | ............... | H04W 52/288 |
| | | | | | | 455/69 |
| 2006/0167657 | A1 | * | 7/2006 | Naffziger et al. | ..... | G06F 1/3203 |
| | | | | | | 702/182 |

(Continued)

FOREIGN PATENT DOCUMENTS

| CN | 1122377 C | 9/2003 |
| CN | 1122377 C | 9/2003 |

(Continued)

*Primary Examiner* — Thomas Lee
*Assistant Examiner* — Mohammad A Rahman
(74) *Attorney, Agent, or Firm* — Steven Reiss (57) ABSTRACT

A modem includes a temperature detecting module, a frequency detecting module, and a power offset calculating module. The temperature detecting module detects a real-time-work temperature of the modem. The frequency detecting module obtains a real-time-work frequency of the modem. The power offset calculating module calculates a power offset by inputting the real-time-work temperature and the real-time-work frequency into a pre-stored calculating model and adjusts a power of the modem according to the calculated power offset. A method of adjusting power of the modem is also provided.

6 Claims, 7 Drawing Sheets

(56) References Cited

U.S. PATENT DOCUMENTS

| | | | |
|---|---|---|---|
| 2009/0296794 A1* | 12/2009 | Min et al. | H04L 5/023 375/222 |
| 2011/0316633 A1* | 12/2011 | Tadano | H03F 1/0288 330/295 |
| 2012/0042192 A1* | 2/2012 | Rae | H03L 1/026 713/500 |
| 2012/0176053 A1* | 7/2012 | Desiderato | H05B 41/28 315/194 |
| 2012/0202561 A1* | 8/2012 | Robinett | H04B 7/0871 455/552.1 |
| 2015/0156734 A1* | 6/2015 | Touret et al. | H04B 7/18513 370/311 |

FOREIGN PATENT DOCUMENTS

| | | |
|---|---|---|
| CN | 101057399 A | 10/2007 |
| CN | 101188463 B | 11/2011 |
| CN | 101188463 B | 11/2011 |
| TW | 201127137 A | 8/2011 |

\* cited by examiner

MODEM AND METHOD OF ADJUSTING POWER

1. Field

Embodiments of the present disclosure generally relate to modem, and more particularly to a modem and a method of adjusting power for the modem.

2. BACKGROUND

Modems generally generate a power offset during operation caused by a difference between a real-time-work temperature and an adjusted temperature in a manufacturing process.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

In general, the word "unit" as used hereinafter, refers to logic embodied in hardware or firmware, or to a collection of software instructions, written in a programming language such as, for example, Java, C, or assembly. One or more software instructions in the units may be embedded in firmware such as in an erasable-programmable read-only memory (EPROM). It will be appreciated that units may comprise connected logic units, such as gates and flip-flops, and may comprise programmable units, such as programmable gate arrays or processors. The units described herein may be implemented as either software and/or hardware units and may be pre-stored in any type of computer-readable medium or other computer storage device.

Figure 1:
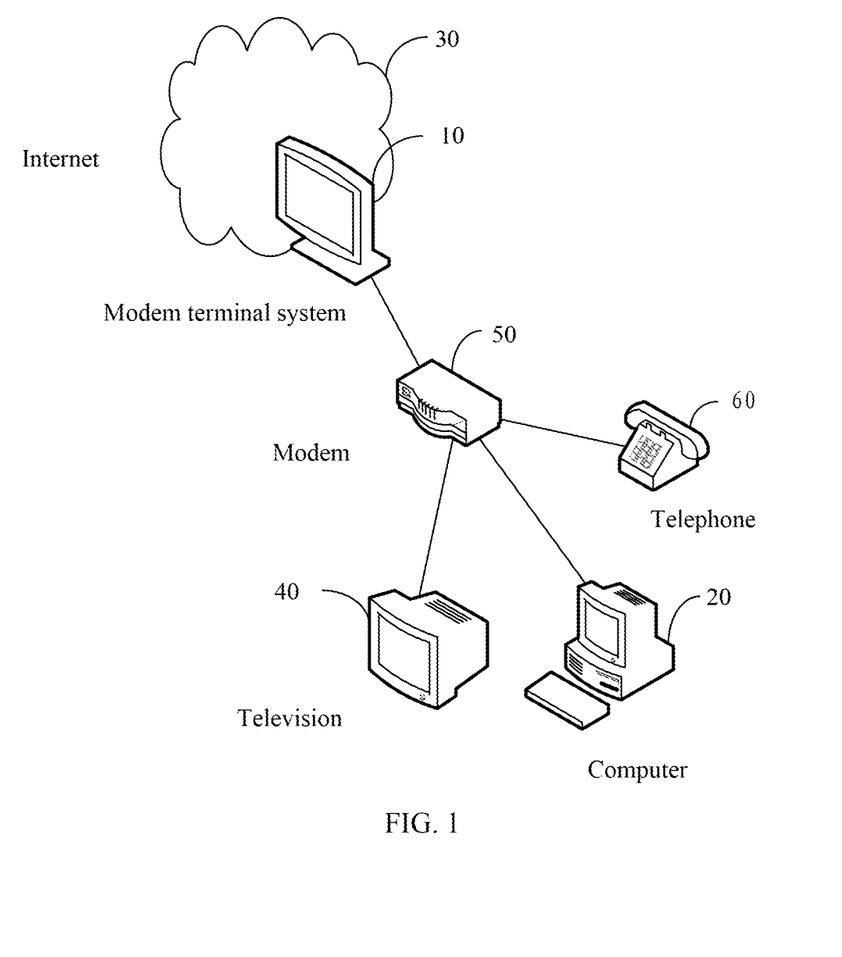
FIG. 1 is a schematic diagram of an embodiment of an application environment of a modem.

FIG. 1 illustrates a schematic diagram of an embodiment of an application environment of a modem 50.

Figure 5:
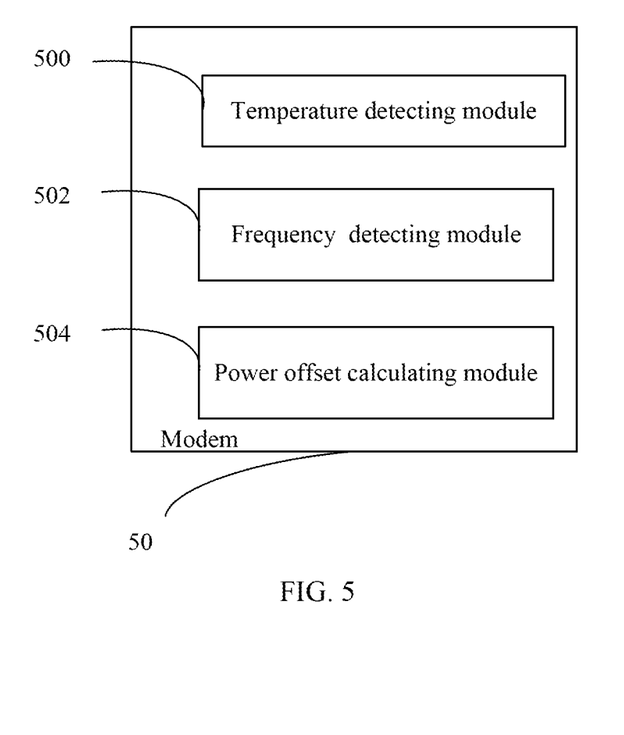
FIG. 5 is a block diagram of an embodiment of function modules of the modem in FIG. 1.

In the present embodiment, the modem 50 is connected to a modem terminal system 10. The modem terminal system 10 is connected to the Internet 30. The modem 50 is further connected to and provides Internet service for a television 40, a computer 20, and a telephone 60. In an embodiment, as shown in FIG. 5, the modem 50 includes a temperature detecting module 500, a frequency detecting module 502, and a power offset calculating module 504.

In the present embodiment, the temperature detecting module 500 detects a real-time-work temperature of the modem 50 when the modem 50 operates, and sends the obtained real-time-work temperature to the power offset calculating module 504. The frequency detecting module 502 obtains a real-time-work frequency of the modem 50, and sends the obtained real-time-work frequency to the power offset calculating module 504. The power offset calculating module 504 includes a calculating model (shown in FIG. 2) pre-stored therein. The power offset calculating module 504 calculates a power offset of the modem 50 according to the detected real-time-work temperature, the obtained real-time-work frequency, and the calculating model. The power offset calculating module 504 adjusts a power of the modem 50 according to the calculated power offset.

Figure 2:
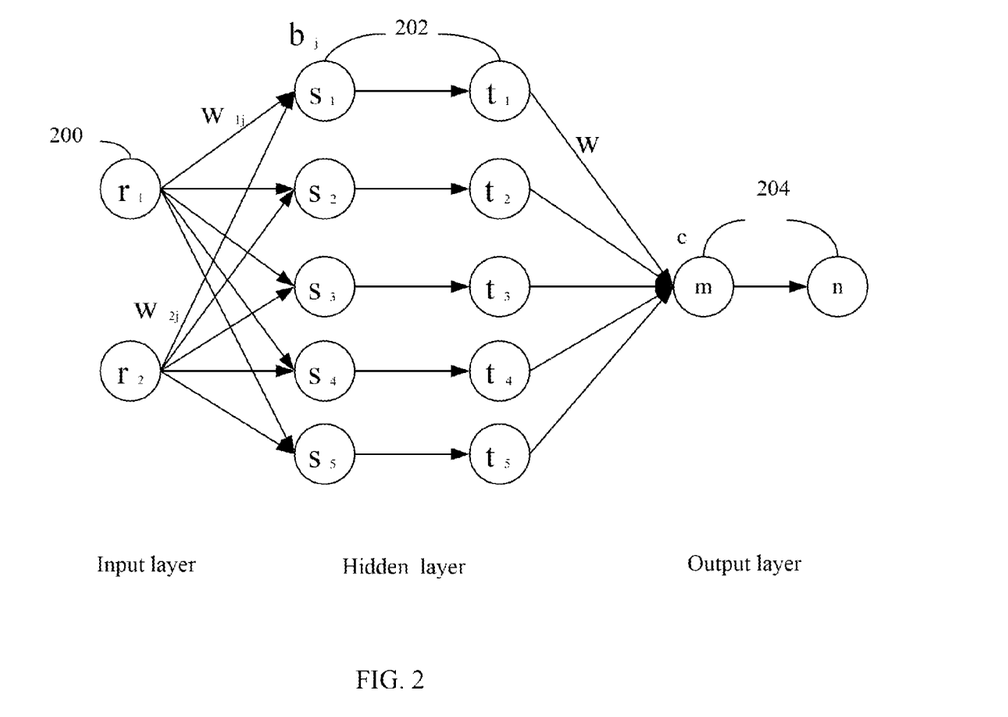
FIG. 2 is a simulation schematic of an embodiment of a calculating model of the modem in FIG. 1.

FIG. 2 illustrates a simulation schematic of the calculating model of the power offset calculating module 504. In an embodiment, the calculating model includes an input layer 200, a hidden layer 202, and an output layer 204.

In the input layer 200, $r_1$ is a real-time-work temperature, and $r_2$ is a real-time-work frequency of the modem 50. The hidden layer 202 calculates $s_j$ according to $w_{ij}$, $b_j$, and $$s_j = \sum_i w_{ij} r_i - b_j$$

(wherein i=1, 2; j=1, 2, 3, 4, 5; and $w_{ij}$, $b_j$ are constants). The hidden layer 202 calculates $t_j$ according to $s_j$, $t_j=f(s_j)$, and $$f(s) = \frac{1}{1+e^{-\alpha s}}.$$

The output layer 204 calculates m according to $t_j$, $w_j$, c, and $$m = \sum_j t_j w_j - c$$

(wherein $w_j$, c are constants). The output layer 204 calculates n according to m and $$n = \frac{1}{1+e^{-\alpha x}}$$

wherein n is the power offset.

FIG. 5 illustrates a block diagram of function modules of the modem 50 in FIG. 1. In the present embodiment, a temperature detecting component of the temperature detecting module 500 can be a thermal resistor or temperature sensor.

Figure 3:
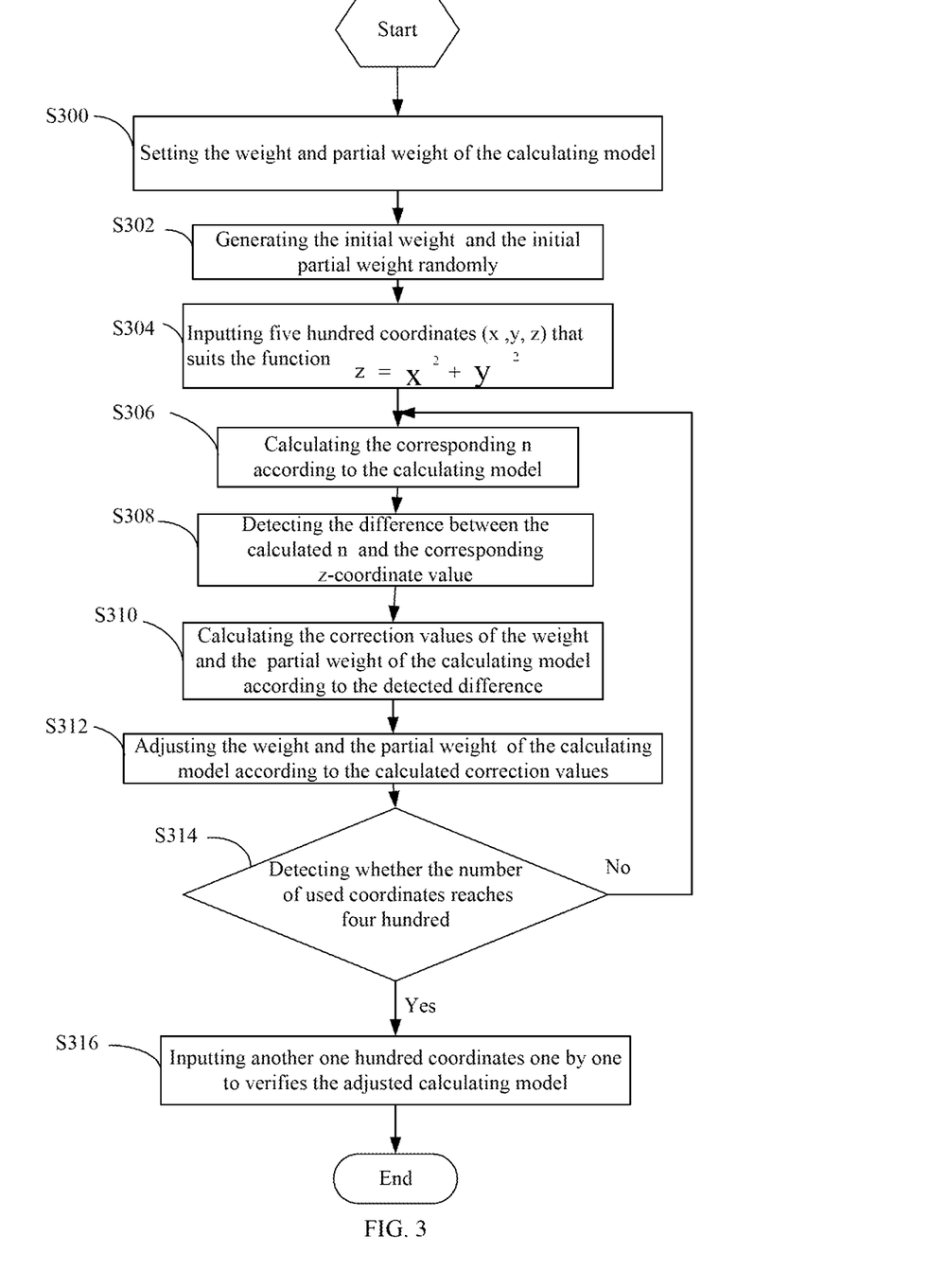
FIG. 3 is a flowchart of an embodiment of a method of building the calculating model of the modem in FIG. 1.

FIG. 3 illustrates a flowchart of a method for building the calculating model of the modem 50. In the present embodiment, the calculating model is simulated according to the formula $z=2x^2+\frac{1}{4}y^2$ (x∈(−2,2), y∈(−2,2)). In the present embodiment, $w_{1j}$ is weight of x, and $w_{2j}$ is weight of y, wherein j=1, 2, 3, 4, 5. $b_j$ is a partial weight of x and y. $w_j$ is a weight of $t_j$, and c is a partial weight of $t_j$. $w_{1j}$, $w_{2j}$, $b_j$, $w_j$, and c are calculated by a Multilayer Perceptron.

In order to calculate $w_{1j}$, $w_{2j}$, $w_j$, $b_j$, and c of the calculating model, five hundred coordinates (x, y, z) of a three-dimensional coordinate system that suit the above-defined function are generated randomly.

Four hundred coordinates of the five hundred coordinates are used for adjusting $w_{1j}$, $w_{2j}$, $w_j$, $b_j$, and c of the calculating model. One hundred coordinates of the five hundred coordinates are used for verifying the simulation module.

In block S300, the Multilayer Perceptron sets $w_{1j}$ as the weight of x, $w_{2j}$ as the weight of y, $b_j$ as the partial weight of x and y, $w_j$ as the weight of $t_j$, and c as the partial weight of $t_j$ (wherein j=1, 2, 3, 4, 5).

In block S302, the Multilayer Perceptron generates the value of $w_{1j}$, $w_{2j}$, $b_j$, $w_j$, and c randomly.

In block S304, the Multilayer Perceptron inputs five hundred coordinates (x, y, z).

In block S306, the Multilayer Perceptron calculates $s_j$ according to x, y, $w_{1j}$, $w_{2j}$, $b_j$, and $$s_j = \sum_j w_{1j}x + \sum_j w_{2j}y - b_j.$$

The Multilayer Perceptron calculates $t_j$ according to the calculated $s_j$, $t_j=f(s_j)$, and $$f(s) = \frac{1}{1+e^{-\alpha s}}.$$

The Multilayer Perceptron calculates m according to $w_j$, c and $$m = \sum_j t_j w_j - b.$$

The Multilayer Perceptron calculates n according to the calculated m and $$n = \frac{1}{1+e^{-\alpha x}}.$$

In block S308, the Multilayer Perceptron detects difference between the calculated n and corresponding z-coordinate value.

In block S310, the Multilayer Perceptron calculates correction values of $w_{1j}$, $w_{2j}$, $b_j$, $w_j$, and c according to the detected difference.

In block S312, the Multilayer Perceptron adjusts $w_{1j}$, $w_{2j}$, $b_j$, $w_j$, and c according to the calculated correction values.

In block S314, the Multilayer Perceptron determines whether the number of used coordinates reaches four hundred. The Multilayer Perceptron returns to block S306 when the number of used coordinates does not reach four hundred. If the number of used coordinates reaches 400, the procedure continues to block S316.

In block S316 the Multilayer Perceptron inputs another one hundred coordinates one by one to verify the adjusted calculating model until the one hundred coordinates are used up.

Figure 4:
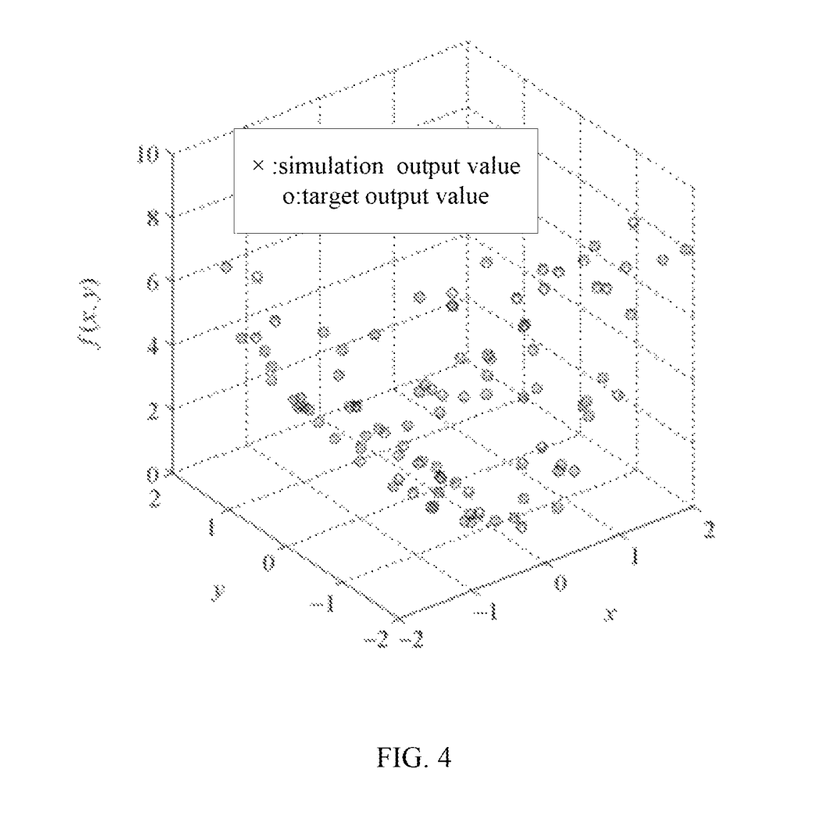
FIG. 4 is a simulation outcome of the calculating model of the modem in FIG. 1.

FIG. 4 illustrates a calculating outcome of the calculating model of the modem 50. In FIG. 4, x represents a simulation output value of the calculating model, and o represents a target output value. Two weight tables have been used to calculate the simulation output value of the calculating model. The two tables are provided below,

TABLE 1 weights $W_{ij}$

| | i | |
|---|---|---|
| j | 1 | 2 |
| 1 | 0.045 | 1.149 |
| 2 | −0.050 | −1.151 |
| 3 | 0.830 | −0.005 |
| 4 | 0.837 | −0.003 |
| 5 | 0.425 | 0.018 |

TABLE 2 weights $W_j$

| j | $W_j$ |
|---|---|
| 1 | −0.683 |
| 2 | −0.681 |
| 3 | 8.206 |
| 4 | −8.109 |
| 5 | −7.223 |

Figure 6:
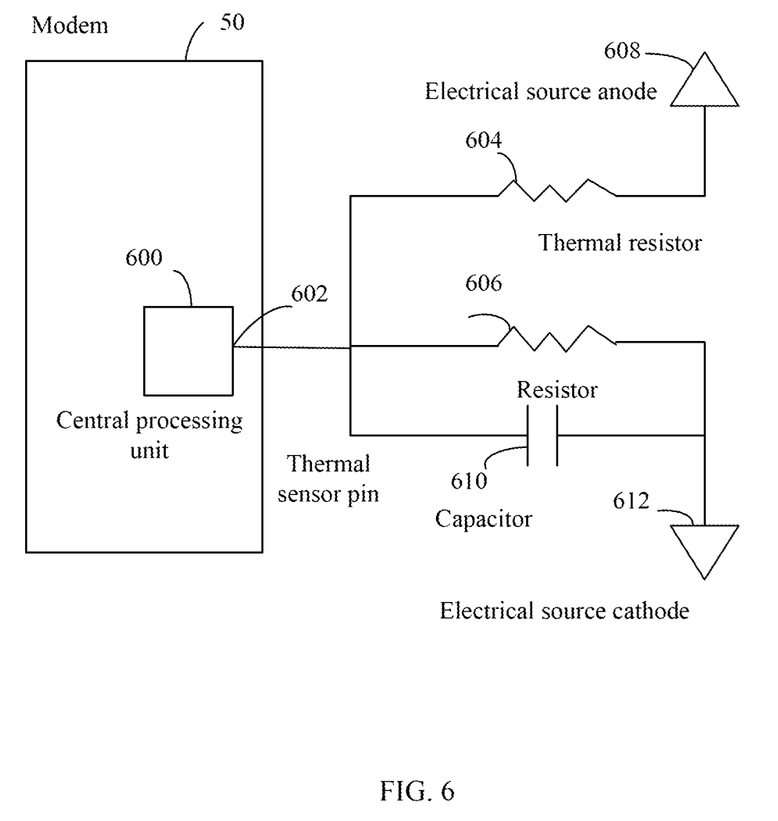
FIG. 6 is a schematic circuit diagram of an embodiment of a temperature detecting module of the modem in FIG. 1.

FIG. 6 illustrates a schematic framework of a temperature detecting module of the modem 50. A central processing unit 600 of the modem 50 includes a thermal sensor pin 602 connected to a thermal resistor 604. The thermal resistor 604 is pre-set over an area of the modulator and demodulator circuit of the modem 50 to detect the real-time-work temperature of the modem 50. An electrical source anode 608 and an electrical source cathode 612 provide an electrical source for the temperature detecting module 500. A resistor 606 and a capacitor 610 are connected in parallel.

Figure 7:
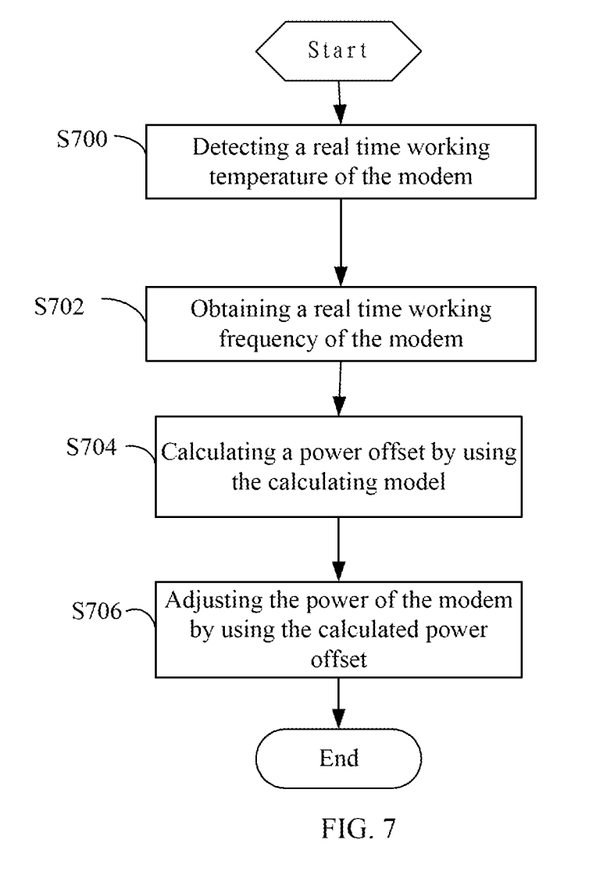
FIG. 7 is a flowchart of one embodiment of a method of adjusting power of the modem.

FIG. 7 illustrates a flowchart of one embodiment of a power adjusting method.

In block S700, the temperature detecting module 500 detects a real-time-work temperature of the modem 50.

In block S702, The frequency detecting module 502 obtains a real-time-work frequency of the modem 50, and sends the obtained real-time-work frequency to the power offset calculating module 504.

In block S704, the power offset calculating module 504 calculates the power offset by inputting the real-time-work temperature and the real-time-work frequency into the pre-stored calculating model.

In block S704, The power offset calculating module 504 adjusts the power of the modem 50 according to the calculated power offset.

In summary, the modem 50 and the method of adjusting power can calculate the power offset by inputting a real-time-work temperature and a real-time-work frequency into a pre-stored power offset calculating module. Thus the modem 50 can accurately adjust the power in time to maintain communication between the modem 50 and the modem terminal system 10.

While various embodiments and methods have been described above, it should be understood that they have been presented by way of example only and not by way of limitation. Thus the breadth and scope of the present disclosure should not be limited by the above-described embodiments, and should be at least commensurate with the following claims and their equivalent

What is claimed is:

1. A modem, comprising:
a modulator and demodulator circuit;
a temperature detecting module, detecting a real-time-work temperature of an area where the modulator and demodulator circuit is located;
a frequency detecting module, detecting a real-time-work frequency of the modem;
at least one processor;
a storage system; and
one or more programs stored in the storage system and executed by the at least one processor, the one or more programs comprising:
a power offset calculating module, calculating a power offset by summing the real-time-work temperature and the real-time-work frequency, wherein, the real-time-work temperature and the real-time-work frequency are assigned with different weights; and
adjusting power of the modem according to the calculated power offset; and
the power offset calculating module calculating the power offset is based on a pre-stored calculating model which is defined as following: formula (1)

$$s_j = \sum_i w_{ij} r_i - b_j,$$

formula (2) $t_j = f(s_j)$, formula (3)

$$f(s) = \frac{1}{1 + e^{-\alpha s}},$$

formula (4)

$$x = \sum_j t_j w_j - c,$$

and formula (5)

$$y = \frac{1}{1 + e^{-\alpha x}};$$

wherein i=1, 2, j=1, 2, 3 . . . n, n is a predetermined integer, $r_1$ is the real-time-work temperature, $r_2$ is the real-time-work frequency, $w_{ij}$, $b_j$, $w_j$, c α are constants, and y is the power offset to calculate.

2. The modem of claim 1, further comprising a central processing unit with a thermal sensor pin, wherein the temperature detecting module comprises a thermal resistor located in the area, and the thermal resistor is connected to the thermal sensor pin to detect the real-time-work temperature of the modem.

3. The modem of claim 1, wherein the power offset calculating module calculates the power offset by:
calculating $s_j$ according to $w_{ij}$, $b_j$, and $$s_j = \sum_i w_{ij} r_i - b_j;$$

calculating $t_j$ according to $s_j$, $t_j = f(s_j)$, and $$f(s) = \frac{1}{1 + e^{-\alpha s}},$$

calculating x according to $w_j$, c, and $$x = \sum_j t_j w_j - c;$$

and
calculating y according to x and $$y = \frac{1}{1 + e^{-\alpha x}}.$$

4. A method of adjusting power of a modem comprising a central processing unit, comprising:
detecting a real-time-work temperature of an area of the modem where a modulator and demodulator circuit is located;
obtaining a real-time-work frequency of the modem;
calculating a power offset by using a pre-stored calculating model to sum the real-time-work temperature and the real-time-work frequency, wherein the real-time-work temperature and the real-time-work frequency are assigned with different weights; and
adjusting the power of the modem according to the calculated power offset; and
the pre-stored calculating model is defined as following: formula (1)

$$s_j = \sum_i w_{ij} r_i - b_j,$$

formula (2) $t_j = f(s_j)$, a formula (3)

$$f(s) = \frac{1}{1 + e^{-\alpha s}},$$

formula (4)

$$x = \sum_j t_j w_j - c,$$

formula (5)

$$y = \frac{1}{1 + e^{-\alpha x}};$$

wherein i=1, 2, j=1, 2, 3 . . . n, n is a predetermined integer, $r_1$ is the real-time-work temperature, $r_2$ is the real-time-work frequency, $w_{ij}$, $b_j$, $w_j$, c, α are constants, and y is the power offset to calculate.

5. The method of claim 4, further comprising:
setting a thermal resistor in the area;

connecting the thermal resistor to a thermal sensor pin of the central processing unit of the modem in series; and detecting the real-time-work temperature of the modem by the thermal resistor.

6. The method of claim 4, further comprising:

calculating $s_j$ according to $w_{ij}$, $b_j$, and $$s_j = \sum_i w_{ij} r_i - b_j;$$

calculating $t_j$ according to $s_j$, $t_j=f(s_j)$, and $$f(s) = \frac{1}{1+e^{-as}};$$

calculating x according to $w_j$, c, and $$x = \sum_j t_j w_j - c;$$

and calculating y according to x and $$y = \frac{1}{1+e^{-ax}}.$$

* * * * *